United States Patent [19]

Welker

[11] 4,224,629
[45] Sep. 23, 1980

[54] DISC CHART PAPER WITH REINFORCED SEPARATING EDGE

[76] Inventor: Robert H. Welker, P.O. Box 138, Sugar Land, Tex. 77478

[21] Appl. No.: 31,753

[22] Filed: Apr. 20, 1979

[51] Int. Cl.³ ............................................. G01D 15/24
[52] U.S. Cl. ..................................................... 346/137
[58] Field of Search ......................................... 346/137

[56] References Cited

U.S. PATENT DOCUMENTS

| | | | |
|---|---|---|---|
| 2,978,287 | 4/1961 | Daugherty | 346/137 |
| 3,064,261 | 11/1962 | Maeder | 346/137 |
| 3,103,402 | 9/1963 | Stoops | 346/137 X |
| 3,109,694 | 11/1963 | Mullins et al. | 346/137 |
| 3,196,452 | 7/1965 | Mullins et al. | 346/137 |
| 3,259,906 | 7/1966 | Falk | 346/137 X |
| 3,781,906 | 12/1973 | Carney | 346/137 |

FOREIGN PATENT DOCUMENTS

| | | |
|---|---|---|
| 1182859 | 12/1964 | Fed. Rep. of Germany ........... 346/137 |
| 1195075 | 6/1965 | Fed. Rep. of Germany ........... 346/137 |
| 568652 | 11/1957 | Italy ......................................... 346/137 |
| 1186976 | 4/1970 | United Kingdom ..................... 346/137 |

*Primary Examiner*—George H. Miller, Jr.
*Attorney, Agent, or Firm*—Donald Gunn

[57] ABSTRACT

For use in recording data on chart paper mounted on a timer driven and operated, rotatable clock mechanism, improved chart paper is disclosed which incorporates a disk of paper having a writing surface thereon adapted to receive markings indicative of a measurement dependent on time, the disk incorporating a central opening. The disk further includes a pair of opposing, facing shoulders separated by a cut in the disk which shoulders include reinforcing means to thereby enable a rotating cutter to separate a single disk from adjacent stacked duplicate disks. The shoulder reinforcing means has alternate forms including a plastic wrap adjacent to both faces and the edge of one shoulder and another form comprising a tongue affixed to one shoulder and lapped beyond the opposing shoulder.

10 Claims, 11 Drawing Figures

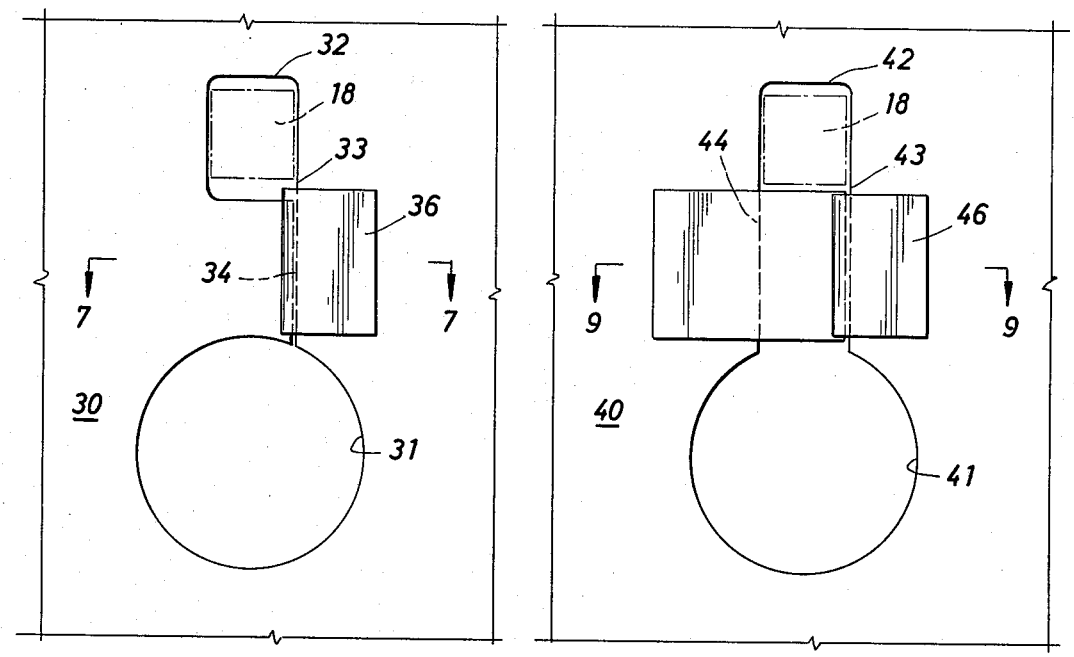
FIG. 6
FIG. 8
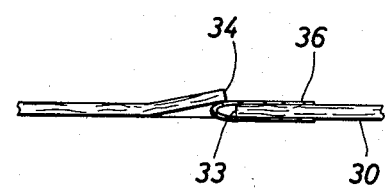
FIG. 7
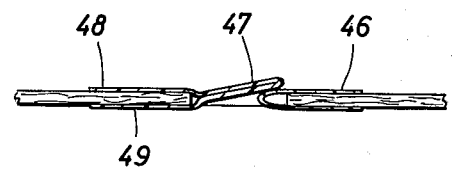
FIG. 9
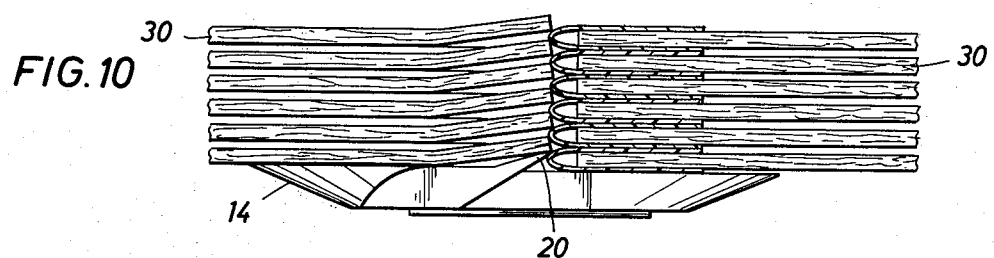
FIG. 10
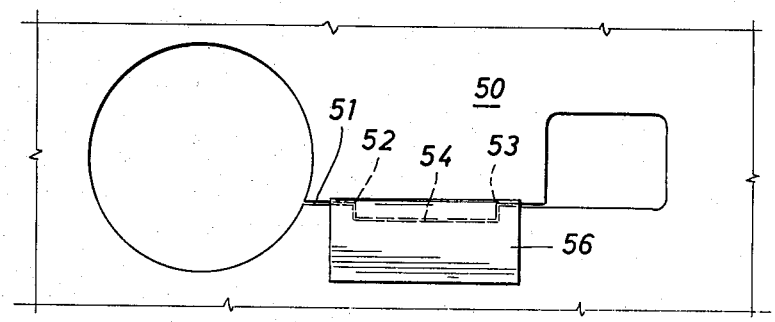
FIG. 11

DISC CHART PAPER WITH REINFORCED SEPARATING EDGE

BACKGROUND OF THE DISCLOSURE

This disclosure is directed to charts to be mounted on a chart drive. A chart drive is a mechanism which rotates a chart to enable a variable quantity dependent on time to be marked on the chart. One chart drive is described in U.S. Pat. No. 2,978,287. In all probability, there are tens of thousands of chart drive mechanisms already installed. A typical chart drive installation includes a motor which rotates a chart adjacent to a marking instrument such as a self-inking pen. The pen, itself, is connected on some kind of movable apparatus, and its position is controlled by a transducer. The transducer measures some quantity of interest.

One typical setting where a chart drive mechanism is utilized is in the measurement of natural gas flowing through a pipeline. Natural gas is sold by applying the actual gas delivered through a pipeline to a norm or standard measure. The standard measure presumes a fixed volume of gas at a specific pressure and specific temperature. In fact, the flow rate of natural gas in a pipeline is highly variant. Also, the temperature of the gas is variant. Therefore, specific knowledge of the flow rate and temperature is required to determine the amount of gas that has been delivered for a given interval. Since flow rate and temperature are dynamic variables, it is necessary to measure both variables and chart them over the time interval of interest. The charting is typically accomplished with a chart drive mechanism of the sort mentioned above.

In most instances, a chart drive recorder mechanism is located at a place where daily service is not ordinarily convenient. Typically, such an apparatus is equipped with more than one chart, the charts being stacked and mounted on a support or backing which is a circular disk. The charts which are mounted on the disk are supported adjacent to the writing instrument so that it can form a mark on every chart. As the mark is made, the chart records the data of interest. Typically, a chart will record data for twenty-four hours. The chart drive mechanism includes a chart ejection mechanism. This device separates the topmost chart (the one having data for the past 24 hours already marked on it) and causes it to be dropped below the equipment into a storage hopper. This then exposes the next chart of the stack. The next chart is then used for recording during the next time interval. This process is repeated indefinitely. Typically, a chart drive mechanism will be installed with a number of charts stacked on it. The charts are actually identical to one another and differ only in that they are used to record different data. A typical installation may require placing fourteen charts on a chart drive mechanism so that data can then be recorded for two weeks.

A typical chart drive installation includes a storage hopper where previously marked and dropped charts are received and stacked. When the equipment is serviced, the charts are removed and carried away for subsequent conversion into data representative of the natural gas which has flowed through the pipeline. Through the use of formulas not relevant, the actual price for natural gas can be calculated and is adjusted to a norm.

Many times, recording chart installations are found in inclement environments. They may be located in coastal or swamp areas and are, therefore, exposed to high humidity levels. They are also installed in very remote locations as, for example, in a locale exposed to extreme cold and inclement weather. If is for this reason that they sometimes cannot be serviced on a daily basis.

It is required of a chart drive mechanism that it run accurately so that accurate measurements can be taken of the data and applied to the price calculation formulas. Indeed, it is not unusual for a chart drive mechanism to be installed on a natural gas pipeline for making measurements to be applied through a formula in the sale of $100,000 worth of gas daily. Clearly, it is essential that the chart drive mechanism operate reliably.

BRIEF DESCRIPTION OF THE DISCLOSURE

The present invention cooperates with the chart drive mechanism. The present invention is improved chart paper to be mounted on a chart drive mechanism. It is, indeed, sometimes catastrophic to not form a chart for a particular day.

One type of malfunction known to occur and to which the present invention is directed destroys the data created by the transducer from the day of the malfunction until the next service call at the equipment. Imagine, as an example, that a malfunction occurs on the fourth day of a fourteen-day cycle of operation. The charts for the first, second and third days are assumed to be correctly formed and dropped into the storage container. The chart for the fourth day is correctly written, but it is not dropped for some reason. The data for the fifth through the fourteenth days are then marked over it, and this forms such a jumble of lines that it is almost impossible to determine what the chart represents during that several day period. When lines are marked on a chart inadvertently for more than one cycle of operation, the data can be very confusing. Sometimes it is possible to recover a portion of the data, but this cannot be relied on.

The present invention is directed to curing of a particular type of malfunction. The chart drive mechanism rotates the charts at the rate of one full revolution for each 24-hour period (presuming a 24-hour chart is used). In addition, the present invention operates once for each time cycle to cause the chart drive mechanism to drop the last fully marked chart to thereby expose the next unmarked chart. The present invention overcomes a very significant problem which occurs. The chart drive mechanism that is believed to be the most common brand of equipment in the industry utilizes a hook-shaped knife edge to cut into a stack of charts so that the topmost chart is cut from the remainder of the stack of charts, and, on rotation of the cutting mechanism, that chart is dropped from the stack of blank charts. It will be appreciated that the paper used in fabrication of a chart has a finite thickness. The thickness is fairly predictable. Accordingly, the knife edge is positioned so that it cuts into the stack at a point which separates the already marked chart from the blank charts in the stack. However, the knife edge cutting mechanism will, on occasion, encounter a facing shoulder of the paper, albeit very thin, and cut into the paper. In light of the limited rotation of the knife edge cutting mechanism, the paper normally sticks to it and rotates with it so that no chart is separated from the stack of remaining charts. The topmost chart is thus sliced around a central opening and remains seated against the remainder of the charts. This leaves it jammed against the other charts, and the data for subsequent time periods is thus marked on one chart. Conversely, the other charts in the stack are not used. Once this occurs, overmarking on the single chart will continue until service personnel open the equipment for removing the many charts thought to be there.

The present invention is an improved chart paper which overcomes this problem. This invention comprises chart paper which is constructed and arranged to be mounted on preexistent drive mechanisms. The apparatus, in particular, includes a round disk paper having a writing surface over the face of the paper with a central perforation for fitting on a hub. Extending from the central opening, the paper incorporates a radially directed slot formed by a pair of facing shoulders. One of the shoulders is a shoulder engaged by the knife edge separator. This shoulder, in accordance with the teachings of this disclosure, is modified by incorporating a U-shaped reinforcing sleeve. The sleeve is U-shaped in cross section and positioned adjacent to the shoulder and forms a sandwich adjacent to the shoulder which serves as reinforcing. This reinforced shoulder thus turns the knife edge so that it will slide past the shoulder and into the interface between adjacent charts, the intended destination of the knife edge mechanism.

An alternate embodiment of the present invention is also disclosed and incorporates a flap which is affixed to the opposing shoulder of the slot and which extends to the reinforced shoulder, the flap serving as a kind of guide whereby the knife edge skims over the flap and moves into the slot.

The improved chart paper of the present invention is particularly able to be stacked in unlimited quantities on a chart drive mechanism. The knife edge mechanism then periodically separates off the topmost chart. As the charts are dropped, the next chart is exposed. Continued operation in this manner enables the chart drive mechanism to record a separate chart for each time interval.

BRIEF DESCRIPTION OF THE DRAWINGS

FIG. 6 discloses a first embodiment of the present invention which incorporates a radially directed slot having a tab extending substantially thereacross and further including a reinforced shoulder construction along the radial slot facing the knife edge mechanism;

FIG. 7 is a sectional view along the line 7—7 of FIG. 6 which shows in enlarged thickness the improved chart mechanism with a reinforced shoulder;

FIG. 8 is a view similar to FIG. 6 showing a second or alternate embodiment of the present invention comprising a reinforced shoulder and an overlapping tab extending from the opposite or facing shoulder;

FIG. 9 is a sectional view along the line 9—9 of FIG. 8 in enlarged thickness showing additional details of construction;

FIG. 10 is a greatly enlarged sectional view disclosing the improved chart of the present invention stacked in quantity and positioned relative to the knife edge mechanism such that individual charts are separated without splitting the chart paper; and FIG. 11 shows a third form of the present invention.

DETAILED DESCRIPTION OF THE ILLUSTRATED EMBODIMENT

Figure 1:
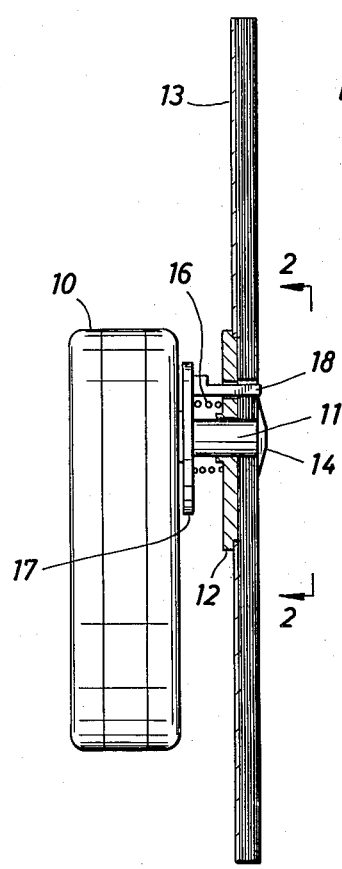
FIG. 1 shows a chart drive mechanism in side view with a plurality of charts stacked thereon and supported on a backing plate to enable writing thereon.

Attention is first directed to FIG. 1 of the drawings, where a chart drive motor 10 is shown in side view. It includes a central drive shaft 11 which supports an enlarged disk 12 which, in turn, supports a circular backing plate 13. The circular plate 13 has a diameter matching that of the chart paper to be mounted on the apparatus and serves as a backing so that a marking instrument (not shown) adjacent to the topmost chart can mark on that chart as the shaft 11 rotates the several charts.

The central shaft 11 includes an overhanging lock washer secured in position by a recessed bolt 15 (in FIG. 2) threading into the end of the shaft 11. The overhanging washer serves as a clamp and clamps a number of identical charts to the backing plate 13. All of the charts are registered relative to one another. All of the charts are positioned around the shaft 11.

The circular plate 13 rides on and is slidably mounted on the shaft 11. It is forced toward the washer by a compressed coil spring 16 which clamps the several charts between the washer 14 and the backing plate 13. As the charts are automatically taken from the shaft 11, the spring forces the backing plate along the shaft 11 to maintain the topmost chart at a specified location. Thus, the stack of charts can include any number of charts which will vary, but the topmost chart always remains positioned adjacent to the marking instrument.

It will be observed that the shaft 11 supports a collar 17 attached to it. The collar 17 rotates with the shaft 11 and supports the coil spring 16. It additionally supports an upstanding, rectangular pin 18 which is rectangular in cross section as shown in FIG. 1. The pin 18 is an alignment pin. It will be appreciated that the chart paper is marked with markings indicative of the elapsed time. For instance, if a chart is to be used on a 24-hour cycle, the time markings around the chart are listed. These are meaningful only when they are registered relative to a reference, and the alignment pin 18 serves as such a reference. It is located at the same location relative to each chart in the stack. This enables the several charts to be marked sequentially with confidence that the data entered thereon is time correlated to the events that transpire.

The apparatus as described to this juncture is supporting structure. It is necessary to understand how the chart drive mechanism operates to impart an understanding of the chart known in the prior art and its failure.

Figure 2:
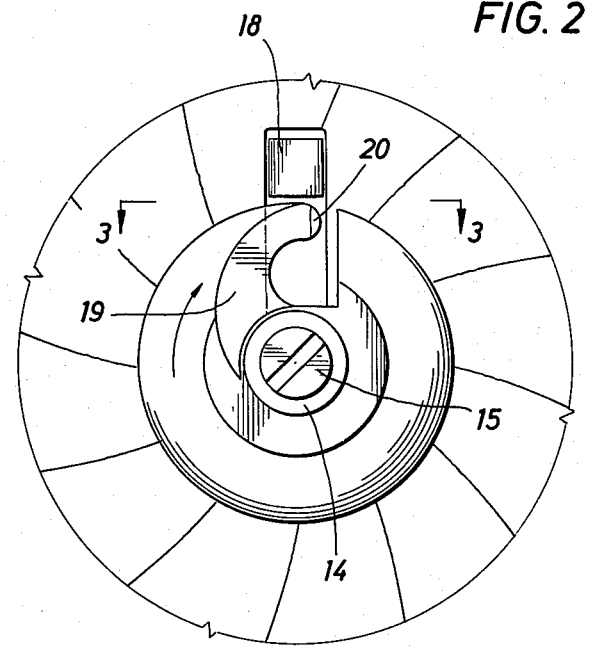
FIG. 2 is a view taken along the line 2—2 of FIG. 1 showing the topmost chart supported on a hub and further disclosing an alignment pin for the charts and a knife edge mechanism for separating the topmost chart.

The central washer 14 supports a curved knife blade 19 which terminates at a knife edge 20. The knife edge 20 is bent at an angle as better shown in FIG. 3 of the drawings. There, the knife edge 20 is extended at an angle toward the stack of charts. When the charts are positioned on the mechanism at the beginning, the knife edge 20 is located at a position near the alignment pin 18. The knife edge 20 is thus positioned as shown in FIG. 2 relative to the alignment pin at all times. It will be understood that all of the apparatus shown in FIG. 1 is driven by the mechanism to rotate as a unit. However, after each revolution (typically requiring 24 hours), the knife edge 20 is rotated rapidly in a time interval of about one second or so. To this end, the knife edge 20 is supported on a separate shaft concentric with the shaft 11 and located on the interior thereof. Its rotation begins at the position shown in FIG. 2 and terminates about one second later at the same position. This movement separates the topmost chart, the remainder of the charts being clamped beneath the curved blade 19 and the washer 14.

Figure 3:
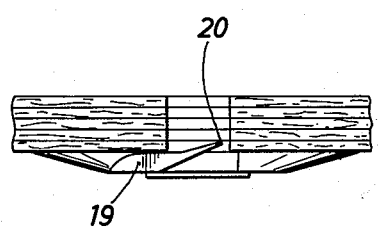
FIG. 3 discloses the position of the knife edge before contact against the stack of charts on the chart drive mechanism and further disclosing the position of the knife edge mechanism relative to the topmost chart.
Figure 4:
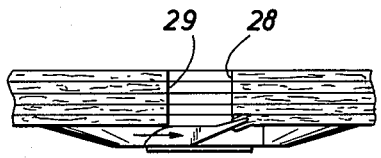
FIG. 4 is a view similar to FIG. 3 showing how the knife edge mechanism will cut into the facing shoulder of the topmost chart and thereby dislodge the chart on movement of the knife edge mechanism.
Figure 5:
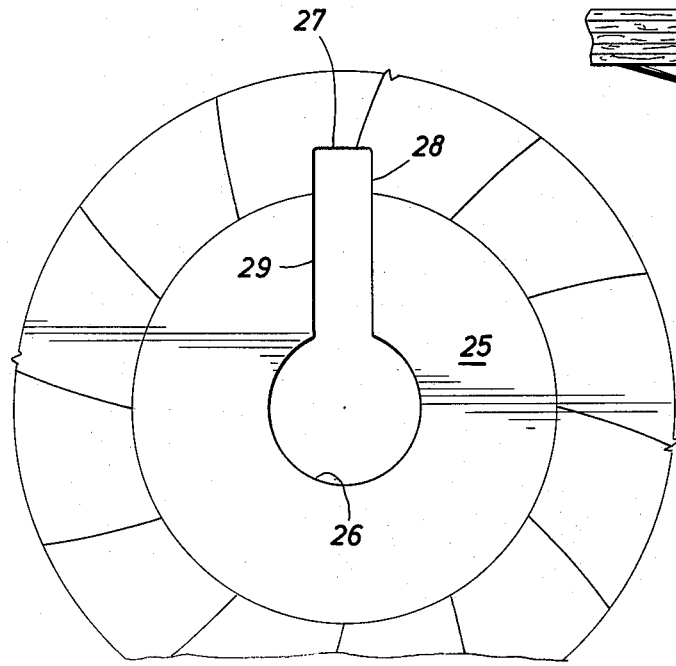
FIG. 5 shows one form of central perforations in a chart comprised of a central opening for fitting around a hub and a radial slot extending from the central opening for receiving an alignment pin.

In FIG. 5 of the drawings, a chart 25 representative of the prior art is illustrated. It has a central hole or perforation 26. This is suitably sized and located to fit about the shaft 11. Registration of the chart relative to the hours marked around the periphery is achieved by the radial slot 27 which extends from the central opening 26. The radial slot 27 is defined by spaced facing shoulders 28 and 29. The two shoulders are preferably parallel to one another. The shoulders 28 and 29 are also shown in FIGS. 3 and 4. The stacked charts of FIGS. 3 and 4 define a suitable gap to enable the knife edge 20 to be inserted between the shoulders. As will be recalled, this initiates the operation of the removal of the topmost chart. This operation is accomplished through the rotation of the knife edge 20.

Attention is next directed to FIG. 6 of the drawings. FIG. 6 is one embodiment of the present invention. In FIG. 6, a chart 30 includes a central opening 31. A generally rectangular hole is perforated into the chart at 32 and is sized to fit the alignment pin 18. The pin 18 thus controls angular positioning of the chart. It will be observed in FIG. 6 of the drawings that the rectangular perforation 32 is connected to the circular hole 31 by a cut formed in the chart 30. The cut defines a first shoulder 33. A second and facing shoulder 34 is also defined by the cut. The two shoulders face one another and are separated by a very small distance, the distance being typical of the width of the knife that cuts the chart material. The chart material is thus a blank of high quality paper. The physical characteristics of the paper can vary over a range which accommodates the chart and chart material. The paper thus has a thickness which approximates that of charts made heretofore and is in the range of about 0.005 inches. The alignment pin 18 fits within the rectangle 32 with tolerance of relative rotation of not more than about two degrees. Alignment of most significance is the position of the knife edge 20 relative to the shoulder which faces it, and this range is held to something under two degrees. The paper is relatively stiff, having the same stiffness as paper used heretofore in chart drive paper. The paper can be calendared and can be formed of varying quantities of rag content to provide more permanent records than would be the case with less expensive paper stock.

The shoulders 33 and 34 are thus about 0.001 to about 0.005 inches apart from one another. The shoulder 34 is unmodified. The shoulder 33, however, is modified in a significant fashion. The shoulder 33 is shown in FIG. 7 to incorporate a U-shaped shield of 36 which is formed of a relatively thin plastic material. It is flexible and foldable. It is folded into a U-shape and joined with a suitable adhesive to both the top and bottom surfaces of the chart 30. It extends into the gap defined by the facing shoulders 33 and 34 and terminates at a radius of curvature where the plastic material is folded. It is desirable that the plastic material be relatively thin and pliable so that it will fold without wrinkling or breaking on the folded portion. It is adhesively joined to the paper on the top and bottom faces. It will be observed that the shoulders 33 and 34 can be positioned parallel to one another so that the paper lies in a single plane absent the affixed member 36. The member 36, however, is joined in such a fashion that it protrudes into the gap between the facing shoulders 33 and 34. This gap is thus narrowed to the extent that the shoulder 34 must lap over. There is range of relative overlap which, in the preferred embodiment, preferably is in the range of about 0.01 to about 0.02 inches. Excessive overlap is unnecessary. No overlap is generally undesirable because the shoulder 34 then blocks the curvature of the shield 36. As shown in FIG. 7, this curvature is fairly well exposed so that the knife edge 20 can slide across the face of the chart paper and toward the shoulder 33. The knife edge, however, encounters the radius of curvature of the shield and slides through the gap defined by the shield 36 and the shoulder 34. This protects the shoulder 33 from splitting. It is not possible to split the paper with the knife edge in the arrangement shown in FIG. 6. This embodiment enables the knife edge to slide past the shoulder 33 inasmuch as the knife edge is intercepted by the shield. The shield, therefore, serves to divert the knife edge away from the square shoulder. This avoids slicing the paper.

It will be understood from the foregoing description that the knife edge is guided by the flap shown in FIG. 7. The flap portion is that portion which is bent away from the plane of the paper which comprises the chart 30. The flap is exaggerated in angle; in actuality, it may be curved rather than bent in straight line segments as shown in FIG. 7. This makes no particular difference inasmuch as the facing surface of the flap contacts against the knife edge at an acute angle, thereby preventing cutting into the flap. By the same token, the knife edge is guided just past the shield 36. The shield thus serves as a strengthening member which prevents splitting of the paper.

One form of material is very thin sheet plastic material which is applied with an adhesive. An alternate form of material is plastic sheet material in a tacky state so that it serves as its own adhesive on contact against the paper which forms the chart. Yet another kind of material is plastic material which is applied in the wet or tacky state and permitted to dry on the chart paper. As an example, glazing material typically applied to paper with a stiffener or binder can also be used. Because it costs extra money, it is normally desirable to limit the area of application to the portion shown in FIG. 7.

FIG. 10 shows several charts which are stacked and supported by the wide shouldered washer 14. It will be observed that the several charts are angularly registered relative to one another so that the overlapping flap on each is stacked above the other and all of the flaps collectively present a surface directing the knife edge 20 above the shoulder 33. Repetitive operation of the knife edge as shown in FIG. 10 will remove one and then the next chart from the stack. The stack can be comprised of many charts, but there is no particular impediment to removing one after the other. All of the charts can be removed in sequence without running the risk of splitting one of the charts at the edge and, thereby, defeating operation of the knife edge mechanism.

An alternate embodiment is identified by the numeral 40 in FIG. 8 and includes a central opening 41 which corresponds to the opening 31 shown in FIG. 6. It also includes a generally rectangular, perforated opening 42 which corresponds to the opening 32 previously described. The opening 42 defines a first shoulder 43 which is parallel to a second shoulder 44. In contrast with FIG. 6 where the two shoulders are very close, they are spaced from one another in FIG. 8 by a width equal to the width of the perforation 42. In effect, a uniform width radial slot extends from the circular opening 41.

The shoulders 43 and 44 are thus a significant distance apart. The shoulder 43 is equipped in the same fashion as the shoulder 33 with a shield 46. The shield 46 is identical in construction to the one shown in FIG. 7. It has the preferred shape shown in FIG. 7, namely, U-shaped in cross section and having a lengthwise extent so that a significant portion of the shoulder 43 is protected by the shield so that it is impossible, or at least practically so, for the knife edge to engage the shoulder without the protection of the shield. The shield preferably has about the same dimensions as the embodiment previously described and is formed of the same materials described for the preferred embodiment.

The embodiment 40 differs in that the two shoulders 43 and 44 are spaced apart by a significant distance. The left hand shoulder supports a flap 47 which is defined by a thin plastic material doubled over. The thin plastic material is adhesively joined to itself to form the flap. The thin plastic material is then adhesively joined to the top and bottom faces of the paper, the two portions being identified by the numerals 48 and 49. The two portions which are adhesively joined together at 47 are adhesively joined to the paper stock forming the chart.

The protective shield 46 has a specified length as shown in FIG. 8, the length being a significant portion of the shoulder 43. The flap 47 is approximately equal in length and laps over the paper by a distance sufficient to assure firm joinder.

The flap 47 has a ready-made hinge. It is fairly stiff in the outer portions where the doubled layers are joined together. It can be bent at the root of the flap. This enables the flap to function in approximately the same manner as the flap shown in FIG. 7.

Several of the charts 40 can be stacked. In the stacked condition, they, again, guide the knife edge 20 to assure that a single chart is engaged on each revolution of the knife edge 20. This arrangement assures proper sequential operation of the equipment. Moreover, this arrangement enables the several charts to be separated from the remainder in single quantities without cutting into the several charts.

FIG. 11 discloses a third form 50 of the improved chart. The chart 50 has a cut line which is not straight. The cut 51 has offsets at 52 and 53 to form a tab 54 of chart paper. On the opposite edge, the profile has an indention where the tab was cut. This is overlaid by a plastic tab 56 affixed in the same manner as the embodiment 30. This implements the same protective shoulder found in FIGS. 6 and 7. The tab 54 need only extend about 0.01 or 0.02 inches over the adjacent plastic tab 56. The tab 56 is constructed of a U-shaped or folded member; alternately, a solid sheet insert adhesively joined to the chart will suffice.

The present invention is thus described in summary form as an improved paper chart having a specially reinforced shoulder. In the preferred embodiment which has been illustrated and described, the shoulder which is first engaged by the knife edge is reinforced in such a way as to prevent the paper from being split by the knife edge. This is particularly important when the knife edge is fairly sharp; it is still important when the knife edge is fairly dull.

The foregoing is directed to the illustrated embodiment, but the scope thereof is determined by the claims which follow.

I claim:

1. In a demountable individual chart having a central opening adapted to fit about a mounting shaft and further including a cooperative alignment opening adapted to fit about an alignment means which chart is for use on a chart drive mechanism and further wherein said chart is azimuthally registered to a selected location by said central and alignment openings and wherein said chart is adapted to be stacked adjacent to a stack of similar charts on said chart drive mechanism and said chart drive mechanism incorporates a rotatable hub having a cutting edge thereon and said cutting edge, on rotation, separates the demountable chart from adjacent similar charts, the improvement which comprises a reinforced shoulder means on said chart which shoulder means is located to engage said cutting edge on said rotatable hub and which shoulder means further enables said cutting edge to rotate relative to said rotatable hub.

2. The apparatus of claim 1 wherein said central opening is round and at the center of said chart, said chart is circular, said alignment opening is offset from the center thereof, said chart has a front face for writing thereon and said chart has an azimuth marking thereon representative of a specified chronological event.

3. The apparatus of claim 1 wherein said central opening has a circular shape and includes a radially outwardly directed split therefrom having two edges and wherein one of said edges is covered along a portion of the length thereof with a reinforcing plastic strip enclosing the edge and at least a part of the top or bottom face of said chart.

4. The apparatus of claim 3 wherein said reinforcing plastic strip is U-shaped in cross section.

5. The apparatus of claim 3 wherein the split in the chart is formed by a cut which is a straight line.

6. The apparatus of claim 3 wherein the split in the chart is formed by a cut which is a straight line interrupted by a protruding tab of chart paper extending over the reinforcing plastic strip.

7. The apparatus of claim 3 wherein said plastic strip is overlaid against the edge of the split to cover the chart paper at the shoulder.

8. The apparatus of claim 3 wherein said chart further includes said second edge, and said second edge comprises a protruding tab means extending toward and over said first edge.

9. The apparatus of claim 8 wherein said tab means is a contiguous portion of a paper stock comprising the major portion of said chart.

10. The apparatus of claim 8 wherein said tab means is an attached appendage sized to extend from one edge toward and beyond said second edge.

* * * * *